United States Patent
Sun et al.

(10) Patent No.: US 6,282,675 B1
(45) Date of Patent: *Aug. 28, 2001

(54) FAULT-TOLERANT ARCHITECTURE FOR IN-CIRCUIT PROGRAMMING

(75) Inventors: Albert C. Sun, Neihu; Chee H. Lee, Sam-Chung; Chang L. Chen, Hsinchu, all of (TW)

(73) Assignee: Macronix International Co., Ltd., Hsinchu (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,118
(22) PCT Filed: Aug. 6, 1997
(86) PCT No.: PCT/US97/13848
  § 371 Date: Feb. 23, 1998
  § 102(e) Date: Feb. 23, 1998
(87) PCT Pub. No.: WO99/08186
  PCT Pub. Date: Feb. 18, 1999
(51) Int. Cl.[7] ................................................ G06F 11/00
(52) U.S. Cl. ................................................ 714/36; 713/3
(58) Field of Search ........................................ 713/1, 2, 100, 713/3; 714/1, 2, 3, 36

(56) References Cited

U.S. PATENT DOCUMENTS

| 4,491,914 | 1/1985 | Sujaku et al. ................ 364/200 |
|---|---|---|
| 5,233,613 | 8/1993 | Allen et al. ................. 371/16.3 |
| 5,247,659 | 9/1993 | Curran et al. ................ 395/575 |
| 5,257,378 | * 10/1993 | Sideserf .......................... 713/100 |
| 5,388,267 | 2/1995 | Chan et al. ................... 395/700 |
| 5,432,927 | 7/1995 | Grote et al. .................. 395/575 |
| 5,701,492 | * 12/1997 | Wadsworth .................... 713/100 |
| 5,826,075 | * 10/1998 | Bealkowski .................... 713/187 |
| 6,009,540 | * 12/1999 | Craft ............................... 714/30 |
| 6,079,016 | * 6/2000 | Park ................................. 713/2 |

* cited by examiner

*Primary Examiner*—Robert Beausoliel
*Assistant Examiner*—Bryce P. Bonzo
(74) *Attorney, Agent, or Firm*—Mark A. Haynes; Haynes & Beffel LLP

(57) ABSTRACT

The present invention provides a method and apparatus for providing fault-tolerance for in-circuit programming systems. The invention operates by storing a minimal set of code to initialize the in-circuit programming process in a protected memory so that if the in-circuit programming process fails, the in-circuit programming process can be restarted from the protected memory. This type of fault-tolerance is especially important in systems which allow the code which accomplishes the in-circuit programming to be modified by the in-circuit programming process. One embodiment of the present invention provides a multiplexer to selectively switch between a normal boot code sequence and a protected boot code sequence, as well as a watchdog timer to monitor the in-circuit programming process to determine whether the in-circuit programming process is not progressing properly.

11 Claims, 4 Drawing Sheets

FAULT-TOLERANT ARCHITECTURE FOR IN-CIRCUIT PROGRAMMING

CROSS-REFERENCE TO RELATED APPLICATIONS

This application is related to international application No. PCT/US96/17302, entitled, "PROCESSOR WITH EMBEDDED IN-CIRCUIT PROGRAM STRUCTURES," filed Oct. 28, 1996 by applicants Macronix International Co., Ltd., for all states other than the United States, and Albert C. Sun, Chee H. Lee and Chang L. Chen for the United States. This application hereby incorporates by reference this prior application.

This application is also related to international application No. PCT/US97/05622, entitled, "IN-CIRCUIT PROGRAMMING ARCHITECTURE WITH ROM AND FLASH MEMORY," filed Apr. 3, 1997 by applicants Macronix International Co., Ltd., for all states other than the United States, and Albert C. Sun, Chee H. Lee and Chang L. Chen for the United States. This application hereby incorporates by reference this prior application.

BACKGROUND

1. Field of the Invention

The present invention relates to a computer system having non-volatile memory for storing sequences of instructions for execution by a processor in the computer system, and more particularly to fault-tolerance techniques for in-circuit programming to update and modify sequences of instructions stored in non-volatile memory.

2. Related Art

Integrated circuit microcontrollers have been developed which include arrays of non-volatile memory on an integrated circuit for storing sequences of instructions to be executed by a microcontroller. The sequences of instructions are stored in read-only memory (ROM), which must be programmed during manufacture of a device, and cannot be updated. The sequences of instructions can also be stored in an EPROM array. However, this approach requires special hardware to program the EPROM array before the device is placed in a circuit. In yet other systems, EEPROM memory is used for storing instructions. EEPROM has the advantage that it can be programmed much more quickly than EPROM, and can be modified on the fly. In yet another approach, flash memory is used to store instructions. This allows for higher density and higher speed reprogramming of the non-volatile memory. When a device combines a reprogrammable non-volatile memory, such as EEPROM or a flash memory, with a microcontroller, the device can be reprogrammed while it is in a circuit, allowing for in-circuit programming based on interactive algorithms.

The ability to interactively download instruction and data to a remote device can be very valuable in a network environment. For example, a company can service a customer's equipment without requiring the customer to bring the equipment to a service center. Rather, the company can execute diagnostic functions using the in-circuit programming capability of the customer's equipment across a communication channel such as the Internet or telephone lines. In this way, software fixes can be downloaded to a customer's equipment, and the equipment can be reenabled with corrected or updated code.

Reliability can become a problem during in-circuit programming. The in-circuit programming process can take up to ten minutes, during which time there may be data transmission errors or recording errors. These errors can be especially troubling if the code which performs the communication with the outside world (handshaking code) is itself modified during the in-circuit programming process. If this code gets corrupted, the in-circuit programming module may be left without any way of resetting itself or communicating with the outside world.

What is needed is a method for providing fault-tolerance during in-circuit programming which can recover from an error during the in-circuit programming process, even if the code used by the in-circuit programming process to communicate with the outside world is improperly programmed.

SUMMARY

The present invention provides a method and an apparatus for providing fault-tolerance during in-circuit programming. The invention operates by ensuring that a portion of the computer system's boot code is protected from the in-circuit programming process, so that it will not be corrupted during in-circuit programming. The invention maintains an in-circuit programming status, which is set to an incomplete value when the in-circuit programming process is in progress, and is reset to a complete value after the in-circuit programming process terminates. If the system is reset during the in-circuit programming process, the system will boot from the protected section of boot code, otherwise, the system will boot from normal boot code, which is programmable through the in-circuit programming process. The invention also operates in conjunction with a watch dog timer which causes the system to reset itself if the in-circuit programming process fails to successfully terminate.

Thus, the present invention can be characterized as a method for providing error recovery during in-circuit programming of a computer system, comprising: setting an in-circuit programming status to an incomplete value, indicating the in-system programming process is in progress; initiating the in-circuit programming process; when the in-circuit programming process terminates, setting the in-circuit programming status to a complete value indicating that the in-circuit programming process is complete; and during initialization of the system, executing a first boot code sequence if the in-circuit programming status has a complete value, the first boot code sequence being programmable through the in-circuit programming process, and executing a second boot code sequence if the in-circuit programming status has an incomplete value, the second boot code sequence being protected from the in-circuit programming process.

According to one aspect of the present invention, the in-circuit programming process includes testing a section of code programmed by the in-circuit programming process.

According to another aspect of the present invention, the in-circuit programming process is monitored in order to detect a delay in the transmission of in-circuit programming instructions. The in-circuit programming process is restarted if the delay exceeds a specific time out value. In one embodiment, the monitoring is conducted by a remote host from which the in-circuit programming code is downloaded. In another embodiment, the monitoring is performed using a watch dog timer coupled to the in-circuit programming system.

According to another aspect of the present invention, the abovementioned method includes the step of storing an address of a remote host from which the in-circuit programming code is downloaded.

The present invention may also be characterized as an apparatus for providing error recovery during in-circuit programming of a computer system, comprising: a processor; a first boot code sequence coupled to the processor; a second boot code sequence coupled to the processor; an in-circuit programming status indicator coupled to the processor, the status indicator being set to an incomplete value during in-circuit programming, and being set to a complete value after in-circuit programming is complete; and a selector mechanism coupled to the first boot code sequence and the second boot code sequence, for selecting a boot code sequence for computer system initialization, the selector mechanism selecting the first boot code sequence if the in-circuit programming status indicator is set to a complete value, and selecting the second boot code sequence if the in-circuit programming status indicator is set to an incomplete value.

The present invention can also be characterized as a method for providing error recovery during in-circuit programming of a computer system, comprising: monitoring the in-circuit program in process in order to detect a delay in transmission of in-circuit programming instructions from a remote host; and restarting the in-circuit programming process if the delay exceeds a timeout value.

DESCRIPTION

The following description is presented to enable any person skilled in the art to make and use the invention, and is provided in the context of a particular application and its requirements. Various modifications to the preferred embodiments will be readily apparent to those skilled in the art, and the general principles defined herein maybe applied to other embodiments and applications without departing from the spirit and scope of the invention. Thus, the present invention is not intended to be limited to the embodiments shown but is to be accorded the widest scope consistent with the principles and features disclosed herein.

Figure 1:
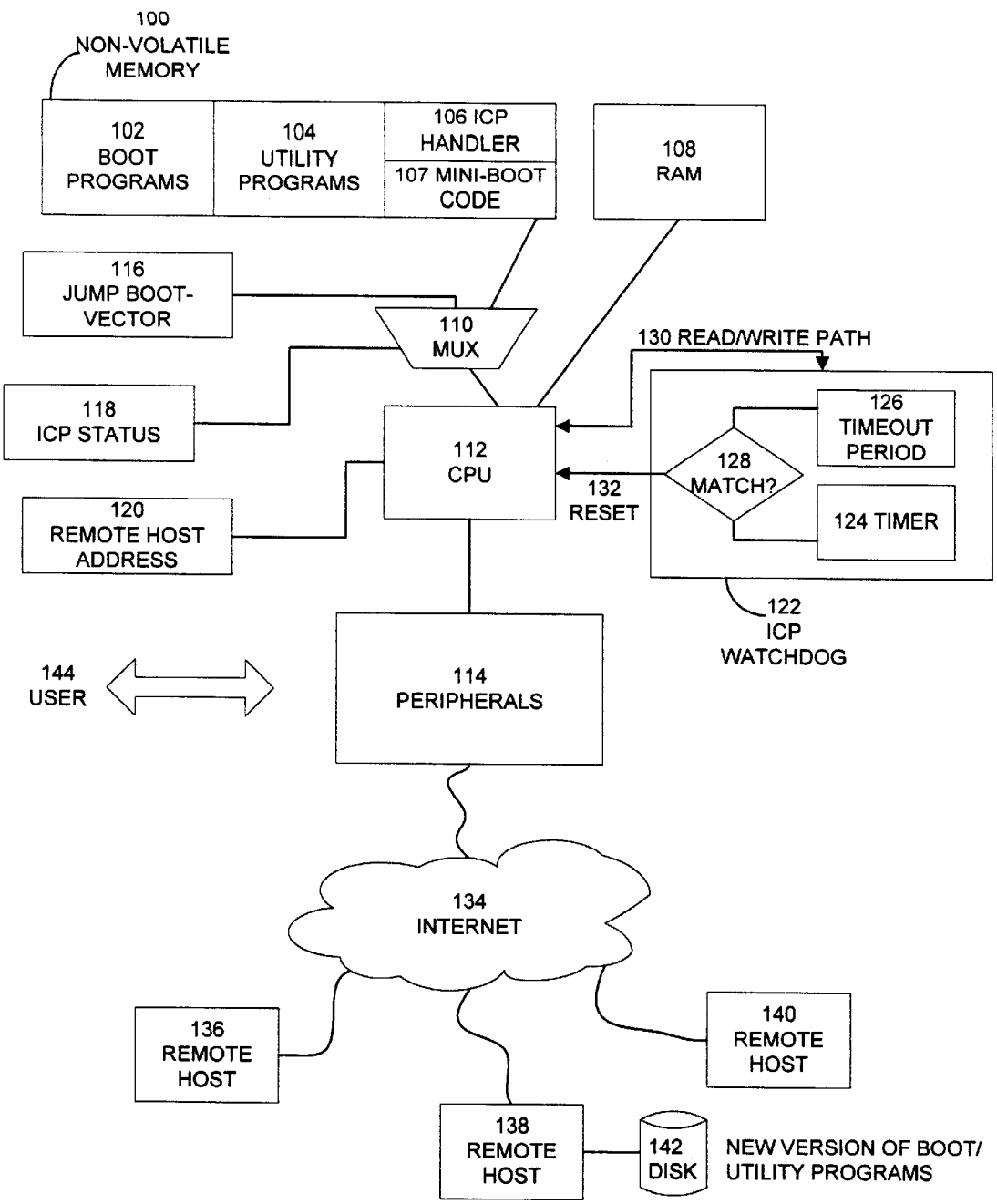
FIG. 1 is a block diagram illustrating some of the major functional components of a fault-tolerance system for in-circuit programming in accordance with an aspect of the present invention.

FIG. 1 is a block diagram illustrating some of the major functional components of a fault-tolerant system for in-circuit programming in accordance with an aspect of the present invention. The in-circuit programming system includes non-volatile memory 100, RAM 108, CPU 112 and peripherals 114. The in-circuit programming system also includes components which implement fault-tolerance, including jump boot vector 116, multiplexer (MUX) 110, ICP status register 118, remote host address register 120 and ICP watchdog 122.

More specifically, CPU 112 is any type of a processing system including a microcontroller, microprocessor or mainframe computing system. CPU 112 is coupled to RAM 108 which is a random access memory containing code and data executed by CPU 112. CPU 112 is additionally coupled to non-volatile memory 100 through MUX 110.

Non-volatile memory 100 is any type of memory that persists when power is removed from the system, including flash memory, EPROM, EEPROM, and ROM memory. Non-volatile memory 100 includes boot programs 102, utility programs 104, ICP handler 106 and mini-boot code 107. Boot programs 102 include a collection of programs which are executed during system initialization in order to initialize the hardware and software resources of the system. Boot programs 102 are stored in programmable memory, which can be modified during the in-circuit programming process. Non-volatile memory 100 also includes utility programs 104, which include programs executed by CPU 112 during operation of the system. Utility programs 104 are also contained within memory that can be programmed through the in-circuit programming process. Non-volatile memory 100 also includes ICP handler 106, which performs the in-circuit programming functions of the system, and which is also contained within memory that can be programmed through the in-circuit programming process.

Non-volatile memory 100 additionally includes mini-boot code 107, which is contained within a protected memory, which cannot be modified during the same in-circuit programming process of normal boot programs. Mini-boot code 107 is an alternative set of system initialization instructions which perform many of the same functions of boot programs 102. However, mini-boot code 107 only springs into action when there is an error during the in-circuit programming process which potentially causes boot programs 102 to be corrupted and unusable. Hence, mini-boot code 107 must be stored in memory that cannot be modified during the same in-circuit programming process of normal boot programs. In one embodiment of the present invention, mini-boot code 107 is stored in mask ROM memory while boot programs 102, utility programs 104 and ICP handler 106 are stored in programmable flash memory.

CPU 112 is additionally coupled to hardware components which facilitate fault tolerance during the in-circuit programming process. CPU 112 is coupled to MUX 110, which takes as inputs non-volatile memory 100 and jump boot vector 116, as well as a control input from ICP status register 118. MUX 110 selectively switches CPU 112 between jump boot vector 116 and non-volatile memory 100, depending upon the state of ICP status 118. If ICP status 118 is dirty, this indicates that a previous in-circuit programming operation did not complete, and CPU 112 takes as input a jump instruction to a boot vector 116 during system initialization, which points to mini-boot code 107. On the other hand, if ICP status 118 is clean, this indicates that no in-circuit programming operation is in progress, and CPU 112 takes as input the initial location of non-volatile memory 100 during system initialization. CPU 112 is additionally coupled to remote host address register 120, which contains a backup copy of the remote host address in case the system is reset during in-circuit programming. CPU 112 is also coupled to ICP watchdog 122 through read/write path 130 and reset line 132. ICP watchdog 122 contains timeout period register 126 and timer 124 as well as match logic 128. Both timer 124 and timeout period 126 can be initialized by CPU 112 through read/write path 130. When the value of timer 124 matches timeout period 126, match logic 128 causes a reset signal to be sent across reset line 123 which feeds into CPU 112. In one embodiment, the above-mentioned hardware components to provide fault-tolerance include programmable memory elements that are protected from the in-circuit programming process.

CPU 112 additionally connects to peripherals 114, which include input and output devices used to communicate with a system user, as illustrated by the double arrow on the left-hand-side of peripherals 114. Peripherals 114 also includes an interface through which peripherals 114 are coupled to Internet 134. Internet 134 is itself coupled to remote hosts 136, 138 and 140. Remote host 138 is coupled to disk 142 which contains new versions of boot and utility programs to be downloaded through Internet 134 into the in-circuit programming system.

The in-circuit programming process generally operates as follows. CPU 112 communicates with user 144 through peripherals 114. User 144 causes CPU 112 to begin executing ICP handler 106 which commences the in-circuit programming process. ICP handler 106 causes a connection to be made through peripherals 114 to Internet 134 and through Internet 134 to remote host 138. Remote host 138 then begins downloading data from disk 142 through Internet 134 to non-volatile memory 100. At the same time the data transfer is initiated, timeout period 126 within ICP watchdog 122 is set to an estimated value and timer 124 is initialized.

If the in-circuit programming process proceeds smoothly, the fault-tolerance features of the present invention are not activated. On the other hand, if there is an excessive delay in the in-circuit programming process, timer 124 will eventually match timeout period 126, causing a reset signal to flow through reset line 132 to CPU 112. This causes CPU 112 to initiate a boot sequence. If the system is rebooted during the in-circuit programming process, ICP status register 118 is set to a dirty value. This causes MUX 110 to direct jump boot vector 116 into CPU 112, which causes CPU 112 to boot from mini-boot code 107 instead of boot programs 102. If ICP status 118 is set to a clean value, this means the in-circuit programming process was complete, and MUX 110 causes CPU 112 to boot from boot programs 102.

Mini-boot code 107 causes CPU 112 to restart the in-circuit programming process by first reading a value from remote host address register 120 to determine which remote host to contact in order to reinitiate the in-circuit programming process. The in-circuit programming process then recommences.

Figure 2A:
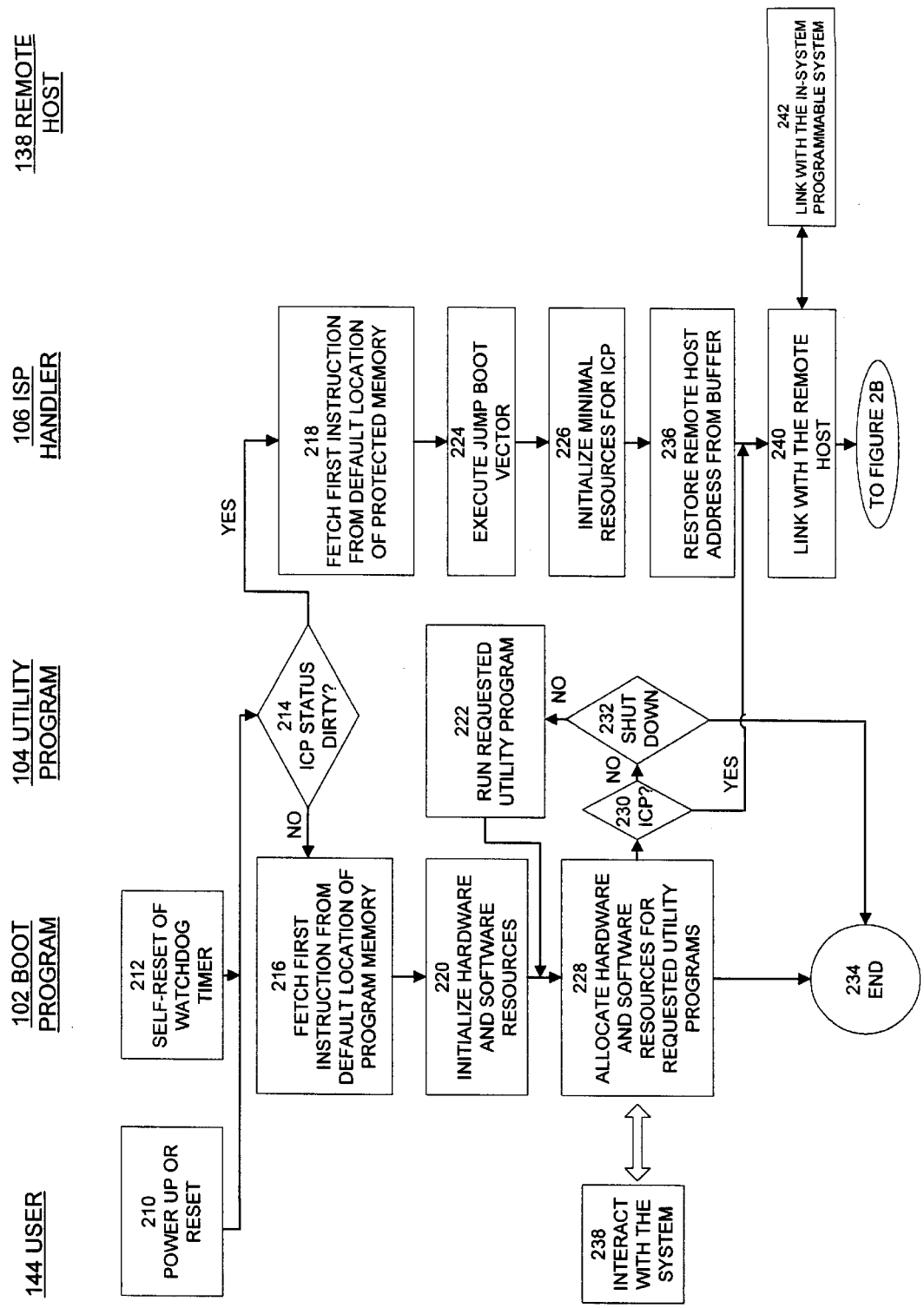
FIGS. 2A, 2B and 2C contain a flowchart illustrating the sequence of operations involved in providing fault-tolerance for an in-circuit programming system in accordance with an aspect of the present invention.
Figure 2B:
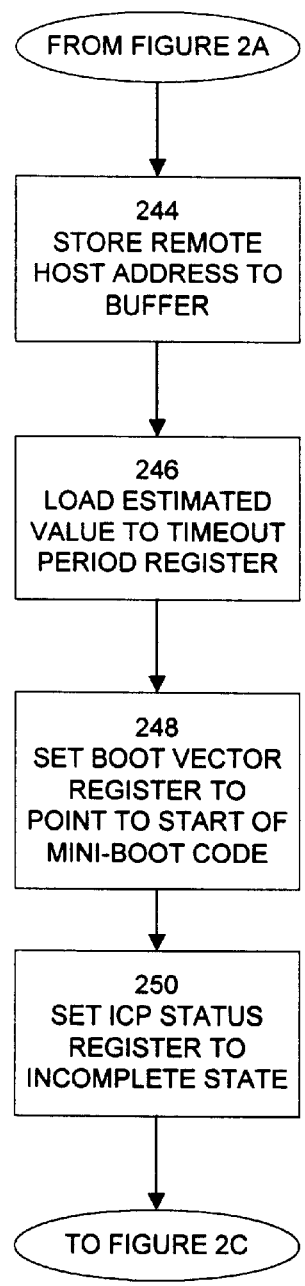
Figure 2C:
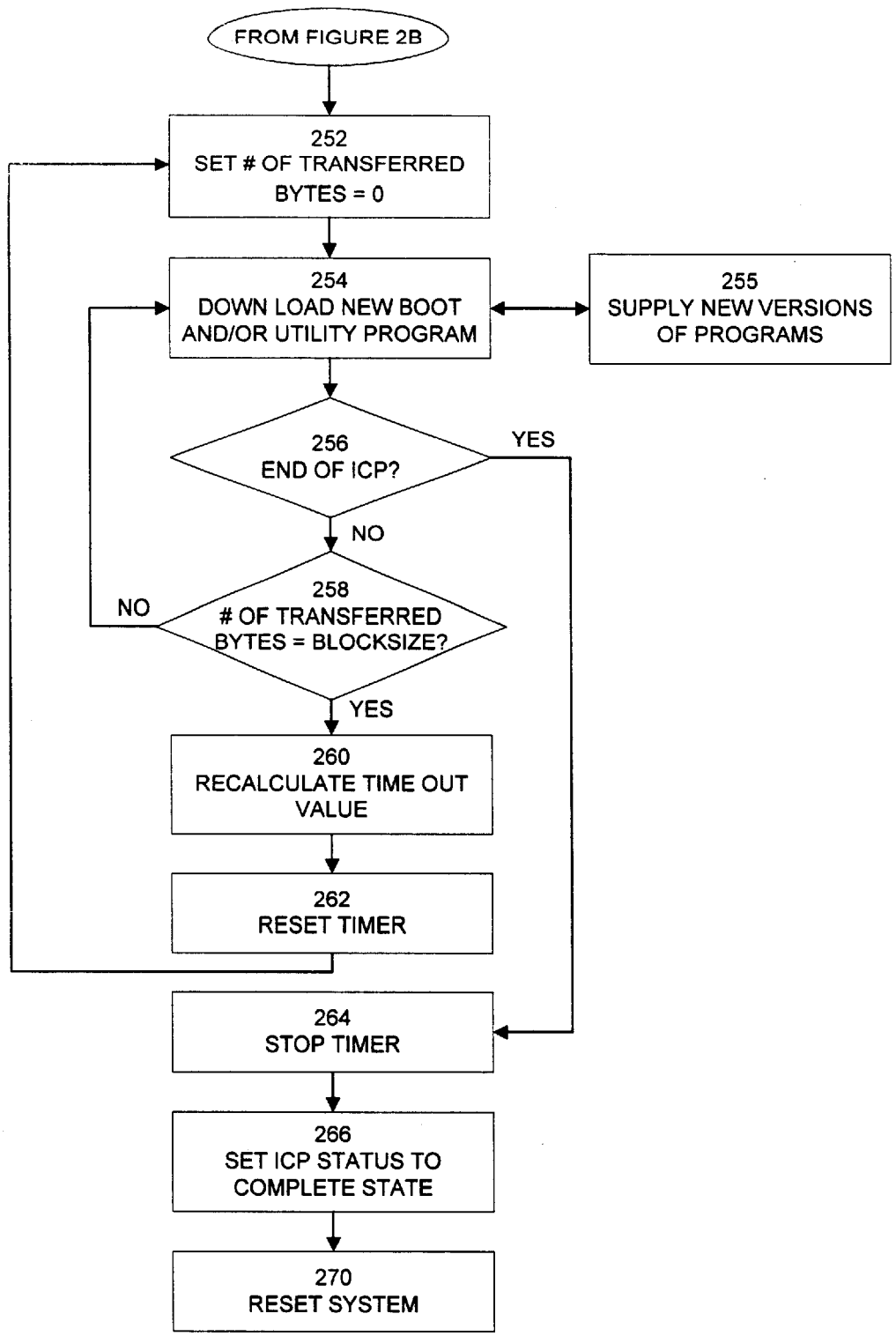

FIGS. 2A, 2B and 2C contain a flowchart illustrating in detail the sequence of operations involved in providing fault-tolerance for an in-circuit programming system in accordance with an aspect of the present invention. The flowchart contains five columns: user 144, boot program 102, utility program 104, ICP handler 106 and remote host 138. Boxes under these column headings indicate actions of user 144, boot program 102, utility program 104, ICP handler 106 and remote host 138, respectively.

The system starts at step 210, in which the system is powered up or reset by the user, or the system starts at step 212, in which the system is self reset by the watchdog timer. The system next proceeds to step 214 in which the system determines whether the ICP status is set to a dirty value. If so, the system proceeds to step 218. If not, the system proceeds to step 216.

At step 216, the ICP status is clean. Hence, the system fetches a first instruction from the default location of the program memory. The system then proceeds to step 220. At step 220, the system initializes hardware and software resources of the system by executing boot programs 102. The system next proceeds to step 228. At step 228, the system allocates the requisite hardware and software resources for requested utility programs. The system next proceeds to step 230. At step 230, the system determines whether in-circuit programming should occur. If not, the system proceeds to step 232. If so, the system proceeds to step 240. At step 232, no in-circuit programming is presently required, and the system determines whether or not to shut down. If so, the system proceeds to step 234 which is an end state. If not, the system proceeds to step 222. At step 222, the system runs the requested utility programs. The system then returns to step 228 to allocate hardware and software resources for the requested utility program. Note, that in step 228 the system may interact with user 144 to determine the proper hardware and software resources to allocate.

At step 218, the ICP status was determined to be dirty upon system boot up. Because it is possible that the regular system boot up code is corrupted, the system fetches the first instruction from a default location in a protected memory that cannot be modified by the in-circuit programming process. The system next proceeds to step 224. At step 224, the system executes a jump instruction to the boot vector which points to the specific entry within the protected memory. The system next proceeds to step 226. At step 226, the system executes mini-boot code 107, which initializes minimal system resources for in-circuit programming. The system next proceeds to step 236. At step 236, the system restores the remote host address from remote host address register 120. The system next proceeds to step 240.

At step 240, the system initiates a link with a remote host from which the in-circuit programming code is downloaded. Correspondingly, at step 242, the remote host 138 links with the in-circuit programming system. The system next proceeds to step 244. At step 244, the system stores the remote host address to remote host address buffer 120. The system next proceeds to step 246. At step 246, the system loads and estimated timeout value to the timeout period register 126. The system next proceeds step 248. At step 248, the system sets the boot vector register 116 to point to the start address of mini-boot code 107. The system next proceeds to step 250. At step 250, the system sets the ICP status register to an incomplete state indicating that in-circuit programming is currently active. The system next proceeds to step 252. At step 252, the system sets the number of transferred bytes to zero. The system next proceeds to step 254. At step 254, the system proceeds to download a new boot and/or utility program into non-volatile memory 100. Correspondingly, remote host 138 supplies new versions of the boot and/or utility programs at step 255. The system then proceeds to step 256. At step 256, the system determines whether the ICP process is finished. If not, the system proceeds to step 258. If so, the system proceeds to step 264. At step 258, the ICP process has not terminated and the system asks whether the number of transferred bytes equals a transfer block size. If not, the system returns to step 254 in order to download more code. If so, the system proceeds to step 260. At step 260, the system recalculates the timeout value based upon performance during transfer of the preceding block in-circuit programming code. The system then proceeds to step 262 wherein timer 124 is reset. The system next returns to step 252, in which the number of transferred bytes is reset to zero.

At step 264, the data transfer for in-circuit programming is complete, and timer 124 is stopped. The system next proceeds to step 266. At step 266, the system sets the ICP status to a complete value, indicating that in-circuit programming is complete. The system then proceeds to step 270. At step 270, the in-circuit programming process is complete and the system is reset.

According to one aspect of the present invention, the in-circuit programming process is governed by a time out period. During this time out period a certain amount of data must be transferred from a remote host to the in-circuit programming system. In one embodiment, this timeout period is downloaded to the processor from the remote host twice, and the two downloaded values are compared agaist each other to ensure that the value is properly downloaded before the value is used as the time out period. In another embodiment, a timeout period is permanently stored in the in-circuit programming system, and a downloaded time out value is compared with the permanently stored value to ensure the downloaded value is at least as large as the permanently stored value. If it is not, the permanently stored value is used.

The foregoing description of the preferred embodiments of the invention have been presented for purposes of illustration and description only. They are not intended to be exhaustive or to limit the invention to the precise forms disclosed. Obviously, many modifications and variations will be apparent to practitioners skilled in the art. It is intended that the scope of the invention be defined by the following claims and their equivalents.

What is claimed is:

1. A method for providing for error recovery during in-circuit programming of a computer system, including:
   setting an in-circuit programming status to an incomplete value, indicating the in-circuit programming process is in progress;
   initiating the in-circuit programming process;
   monitoring the in-circuit programming process in order to detect a delay in transmission of in-circuit programming instructions;
   reinitializing the computer system and restarting the in-circuit programming process if the delay exceeds a timeout value, wherein the timeout value is downloaded twice from a remote host, and the two values are compared against each other to verify that they match to ensure that the timeout values are downloaded properly;
   when the in-circuit programming process terminates, setting the in-circuit programming status to a complete value indicating the in-circuit programming process is complete; and
   during initialization of the system, executing a first boot code sequence if the in-circuit programming status has a complete value, being programmable through the in-circuit programming process, and executing a second boot code sequence if the in-circuit programming status has an incomplete value, the second boot code sequence being protected from the in-circuit programming process.

2. A method for providing for error recovery during in-circuit programming of a computer system, including:
   setting an in-circuit programming status to an incomplete value, indicating the in-circuit programming process is in progress;
   initiating the in-circuit programming process;
   monitoring the in-circuit programming process in order to detect a delay in transmission of in-circuit programming instructions;
   reinitializing the computer system and restarting the in-circuit programming process if the delay exceeds a timeout value, wherein a first timeout value is downloaded from a remote host and is compared against a second timeout value which is permanently stored in the computer system to ensure that the first timeout value is at least as large as the second timeout value, and if not using the second timeout value as the timeout value;
   when the in-circuit programming process terminates, setting the in-circuit programming status to a complete value indicating the in-circuit programming process is complete; and
   during initialization of the system, executing a first boot code sequence if the in-circuit programming status has a complete value, being programmable through the in-circuit programming process, and executing a second boot code sequence if the in-circuit programming status has an incomplete value, the second boot code sequence being protected from the in-circuit programming process.

3. A method for providing for error recovery during in-circuit programming of a computer system, including:
   setting an in-circuit programming status to an incomplete value, indicating the in-circuit progamming process is in progress;
   initiating the in-circuit programming process;
   monitoring the in-circuit programming process in order to detect a delay in transmission of in-circuit programming instructions, wherein the monitoring is performed by a remote host from which the in-circuit programming code is downloaded;
   when the in-circuit programming process terminates, setting the in-circuit programming status to a complete value indicating the in-circuit programming process is complete; and
   during initialization of the system, executing a first boot code sequence if the in-circuit programming status has a complete value, being programmable through the in-circuit programming process, and executing a second boot code sequence if the in-circuit programming status has an incomplete value, the second boot code sequence being protected from the in-circuit progamming process.

4. A method for providing for error recovery during in-circuit programming of a computer system, including:
   setting an in-circuit programming status to an incomplete value, indicating the in-circuit programming process is in progress;
   initiating the in-circuit programming process;
   when the in-circuit programming process terminates, setting the in-circuit programming status to a complete value indicating the in-circuit programming process is complete; and
   during initialization of the system, executing a first boot code sequence if the in-circuit programming status has a complete value, being programmable through the in-circuit programming process, and executing a second boot code sequence if the in-circuit programming status has an incomplete value, the second boot code sequence being protected from the in-circuit programming process;
   wherein the computer system is coupled to a remote host through which the in-circuit programming code is downloaded, and including the step of using the remote host to determine a timeout value for a transmission of in-circuit programming code.

5. A method for providing for error recovery during in-circuit progamming of a computer system, including:
   setting an in-circuit programming status to an incomplete value, indicating the in-circuit programming process is in progress;
   determining a timeout value for transmissions of in-circuit programming code based upon system performance during prior downloading of data to the processor;
   initiating the in-circuit programming process;

when the in-circuit programming process terminates, setting the in-circuit programming status to a complete value indicating the in-circuit programming process is complete; and during initialization of the system, executing a first boot code sequence if the in-circuit programming status has a complete value, being programmable through the in-circuit programming process, and executing a second boot code sequence if the in-circuit programming status has an incomplete value, the second boot code sequence being protected from the in-circuit programming process.

6. An apparatus for providing error recovery during in-circuit programming of a computer system, comprising:

a processor;

a first boot code sequence coupled to the processor;

a second boot code sequence coupled to the processor;

an in-circuit programming status indicator coupled to the processor, the status indicator being set to an incomplete value during in-circuit programming, and being set to a complete value after in-circuit programming is complete; and a selector mechanism coupled to the first boot code sequence and the second boot code sequence, for selecting a boot code sequence for computer system initialization, the selector mechanism selecting the first boot code sequence if the in-circuit programming status indicator is set to a complete value, and selecting the second boot code sequence if the in-circuit programming status indicator is set to an incomplete value;

wherein the processor is coupled to a remote host through which the in-circuit programming code is downloaded, the remote host monitoring the in-circuit programming process in order to detect a delay in transmission of in-circuit programming instructions.

7. An apparatus for providing error recovery during in-circuit programming of a computer system, comprising:

a processor;

a first boot code sequence coupled to the processor;

a second boot code sequence coupled to the processor;

an in-circuit programming status indicator coupled to the processor, the status indicator being set to an incomplete value during in-circuit programming, and being set to a complete value after in-circuit programming is complete; and a selector mechanism coupled to the first boot code sequence and the second boot code sequence, for selecting a boot code sequence for computer system initialization, the selector mechanism selecting the first boot code sequence if the in-circuit programming status indicator is set to a complete value, and selecting the second boot code sequence if the in-circuit programming status indicator is set to an incomplete value;

wherein:
the processor is coupled to a remote host through which the in-circuit programming code is downloaded; and
the remote host determines a timeout value for transmissions of in-circuit programming code.

8. An apparatus for providing error recovery during in-circuit programming of a computer system, comprising:

a processor;

a first boot code sequence coupled to the processor;

a second boot code sequence coupled to the processor;

an in-circuit programming status indicator coupled to the processor, the status indicator being set to an incomplete value during in-circuit programming, and being set to a complete value after in-circuit programming is complete;

a selector mechanism coupled to the first boot code sequence and the second boot code sequence, for selecting a boot code sequence for computer system initialization, the selector mechanism selecting the first boot code sequence if the in-circuit programming status indicator is set to a complete value, and selecting the second boot code sequence if the in-circuit programming status indicator is set to an incomplete value; and a timeout value for transmissions of in-circuit programming code coupled to the apparatus which is determined based upon system performance during prior downloading of data to the processor.

9. A method for providing for error recovery during in-circuit programming of a computer system, comprising:

monitoring the in-circuit programming process in order to detect a delay in transmission of in-circuit programming instructions from a remote host; and restarting the in-circuit programming process if the delay exceeds a timeout value;

wherein the step of monitoring is performed by a remote host from which the in-circuit programming code is downloaded.

10. A method for providing for error recovery during in-circuit programming of a computer system, comprising:

monitoring the in-circuit programming process in order to detect a delay in transmission of in-circuit programming instructions from a remote host; and restarting the in-circuit programming process if the delay exceeds a timeout value;

wherein the computer system is coupled to a remote host through which the in-circuit programming code is downloaded, and including the step of using the remote host to determine a timeout value for a transmission of in-circuit programming code.

11. A method for providing for error recovery during in-circuit programming of a computer system, comprising:

monitoring the in-circuit programming process in order to detect a delay in transmission of in-circuit programming instructions from a remote host; and restarting the in-circuit programming process if the delay exceeds a timeout value;

wherein the step of monitoring is performed by a remote host from which the in-circuit programming code is downloaded.

* * * * *